US010562530B2

(12) United States Patent
Kamatani et al.

(10) Patent No.: US 10,562,530 B2
(45) Date of Patent: Feb. 18, 2020

(54) DRIVING SUPPORT APPARATUS

(71) Applicant: TOYOTA JIDOSHA KABUSHIKI KAISHA, Toyota-shi, Aichi-ken (JP)

(72) Inventors: Miyuki Kamatani, Susono (JP); Minami Sato, Ebina (JP); Kohei Tochigi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 331 days.

(21) Appl. No.: 15/810,359

(22) Filed: Nov. 13, 2017

(65) Prior Publication Data

US 2018/0170381 A1 Jun. 21, 2018

(30) Foreign Application Priority Data

Dec. 15, 2016 (JP) .................................. 2016-243315

(51) Int. Cl.
*B60W 30/14* (2006.01)
*B60W 10/06* (2006.01)
*B60W 30/165* (2020.01)
*B60W 30/16* (2020.01)
*B60W 10/10* (2012.01)
*B60W 30/17* (2020.01)
*B60W 10/18* (2012.01)
*B60W 10/20* (2006.01)

(52) U.S. Cl.
CPC .......... *B60W 30/143* (2013.01); *B60W 10/06* (2013.01); *B60W 10/10* (2013.01); *B60W 10/18* (2013.01); *B60W 10/20* (2013.01); *B60W 30/16* (2013.01); *B60W 30/162* (2013.01); *B60W 30/165* (2013.01); *B60W 30/17* (2013.01); *B60W 2550/10* (2013.01); *B60W 2550/22* (2013.01); *B60W 2720/10* (2013.01); *B60W 2720/106* (2013.01)

(58) Field of Classification Search
CPC .. B60W 30/143; B60W 30/16; B60W 30/162; B60W 30/165; B60W 30/17; B60W 10/06; B60W 10/10; B60W 10/18; B60W 10/20; B60W 2550/10; B60W 2550/22; B60W 2720/10; B60W 2720/106
USPC ......................................................... 701/93
See application file for complete search history.

(56) References Cited

U.S. PATENT DOCUMENTS 4,723,213 A * 2/1988 Kawata ................ B60K 31/107
180/176
8,903,614 B1 * 12/2014 Jeon ......................... G07C 5/08
701/57

(Continued)

FOREIGN PATENT DOCUMENTS

EP  1281561 A2 * 2/2003 ......... B60K 31/0008
JP  1-113543 A  5/1989

(Continued)

*Primary Examiner* — Tuan C To
(74) *Attorney, Agent, or Firm* — Sughrue Mion, PLLC

(57) ABSTRACT

A driving support apparatus (12) performs a second support after forbidding acceleration by a first support, keeps forbidding the acceleration by the first support after the second support is completed and before a predetermined acceleration allowing condition is satisfied, and allows the acceleration by the first support after the acceleration allowing condition is satisfied, if both of an execution condition for the first support and an execution condition for the second support are satisfied.

5 Claims, 4 Drawing Sheets

(56) References Cited

U.S. PATENT DOCUMENTS

| | | | |
|---|---|---|---|
| 2007/0208485 A1 | 9/2007 | Yamamura et al. | |
| 2010/0204897 A1* | 8/2010 | Labuhn | B60W 30/16 |
| | | | 701/93 |
| 2010/0324796 A1 | 12/2010 | Takeuchi et al. | |
| 2011/0257862 A1* | 10/2011 | Lee | B60T 7/22 |
| | | | 701/96 |
| 2016/0039409 A1* | 2/2016 | Hayakawa | B60W 30/06 |
| | | | 701/70 |
| 2016/0368444 A1* | 12/2016 | Kim | B60Q 9/00 |
| 2017/0089699 A1* | 3/2017 | Azuma | G01C 9/08 |
| 2017/0151951 A1* | 6/2017 | Jeon | B60W 10/02 |
| 2017/0174034 A1* | 6/2017 | Liu | B60G 17/0165 |
| 2017/0174211 A1* | 6/2017 | Mizoguchi | B60W 10/06 |
| 2019/0295417 A1* | 9/2019 | Hiramatsu | B60W 30/16 |

FOREIGN PATENT DOCUMENTS

| | | |
|---|---|---|
| JP | 3695296 B2 * | 9/2005 |
| JP | 2007-230440 A | 9/2007 |
| JP | 2008-006947 A | 1/2008 |
| JP | 2014196022 A * | 10/2014 |
| JP | 5923875 B2 * | 5/2016 |
| JP | 2016-149109 A | 8/2016 |
| WO | 2009/101769 A1 | 8/2009 |

* cited by examiner

[FIG. 1]
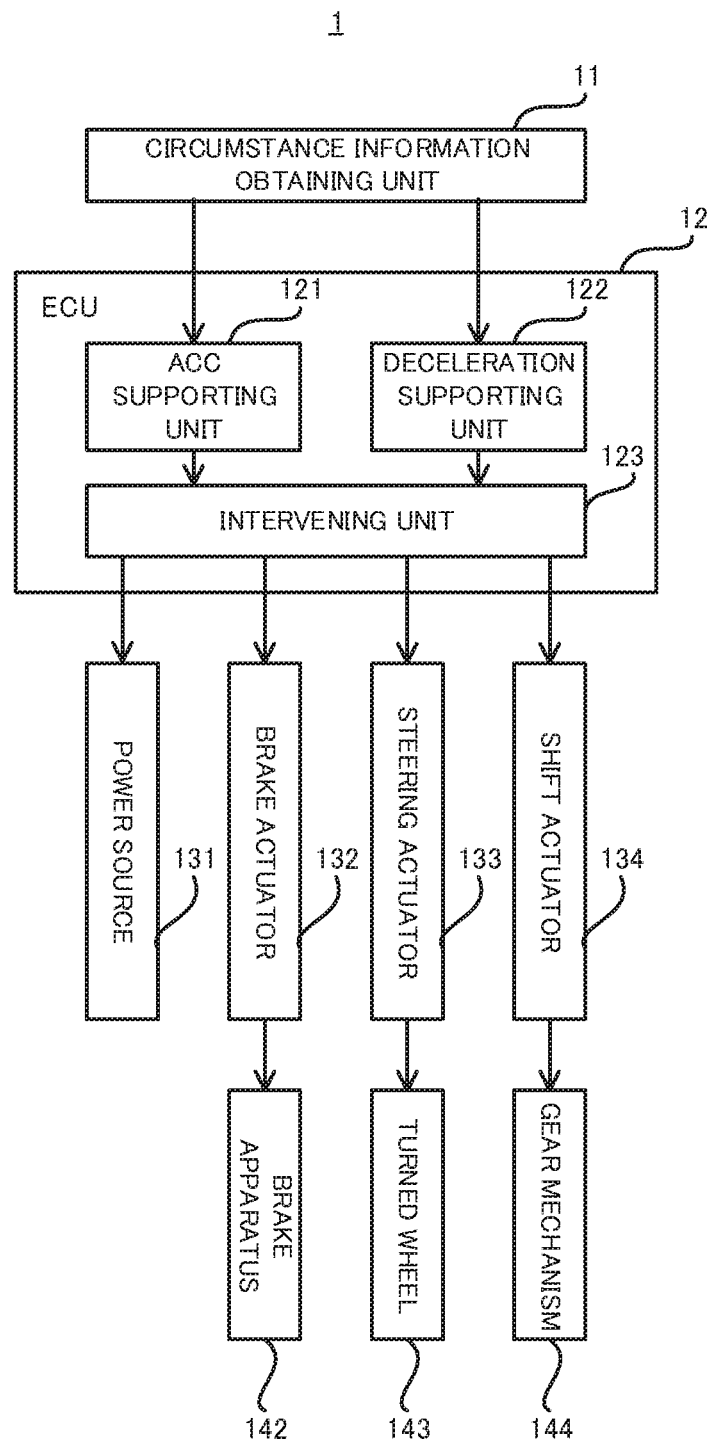

[FIG. 2]
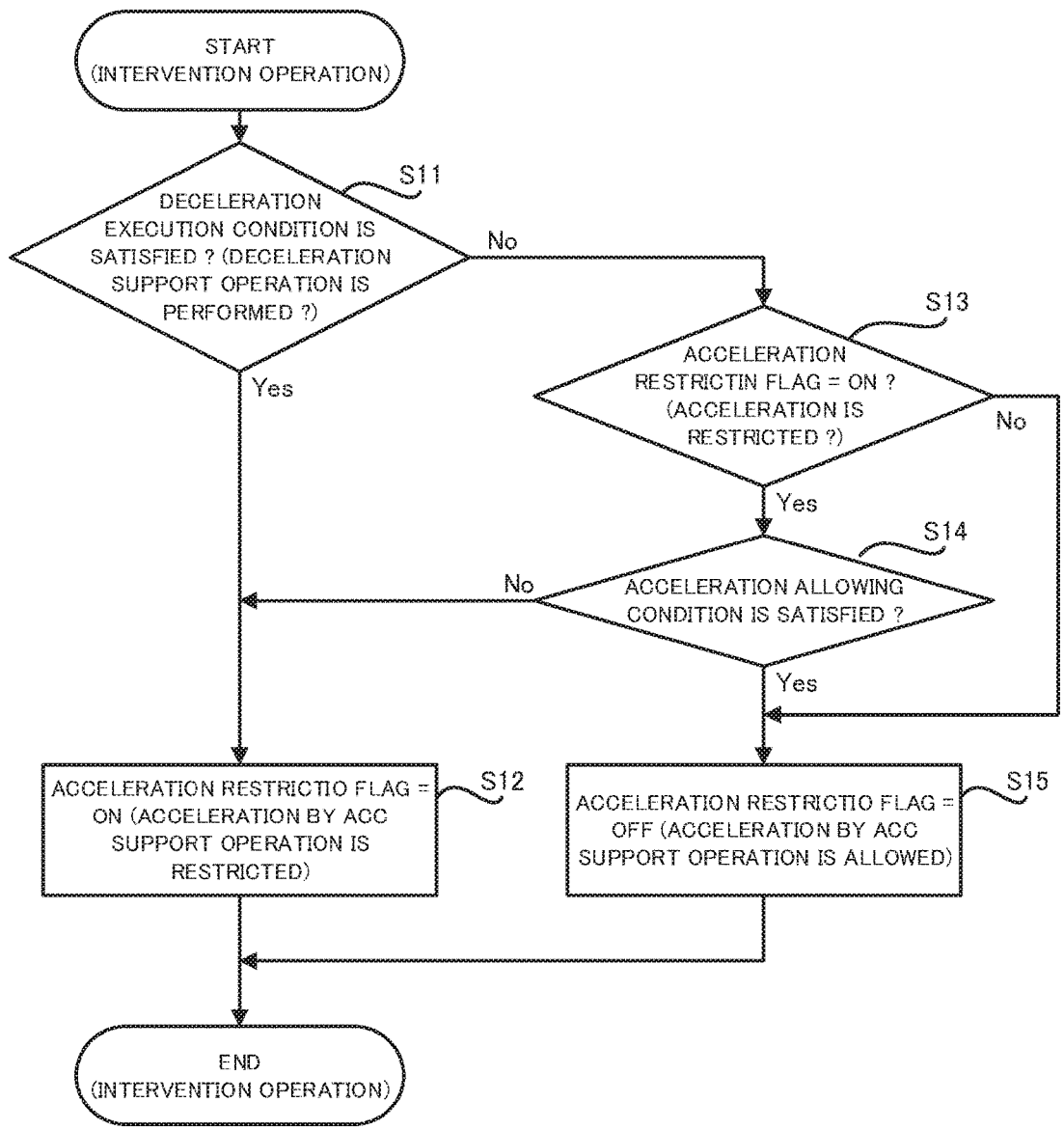

[FIG. 3]
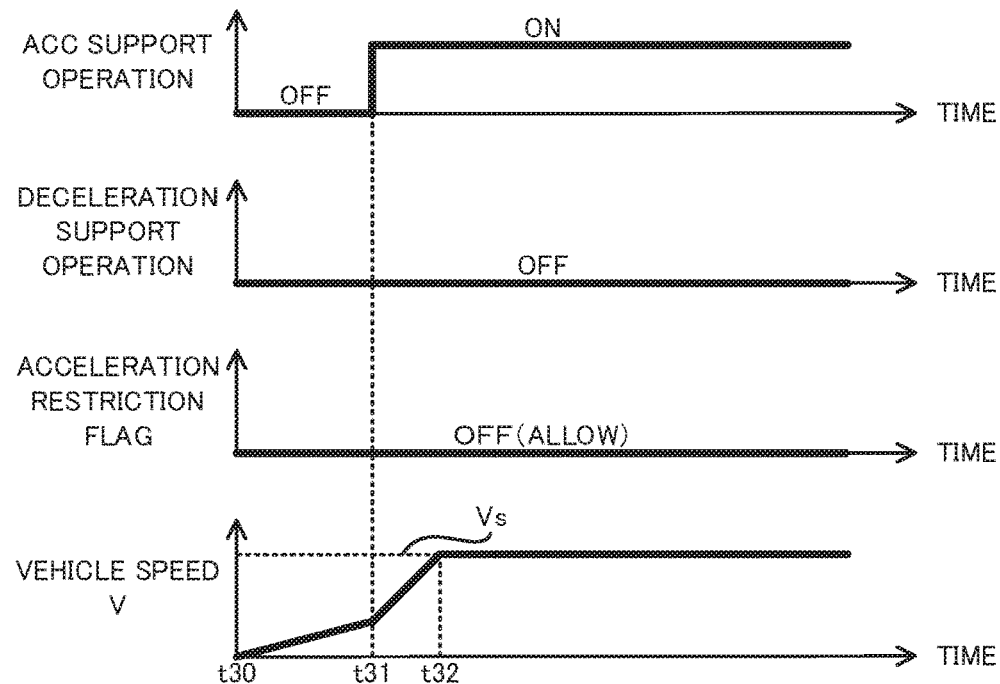
[FIG. 4]
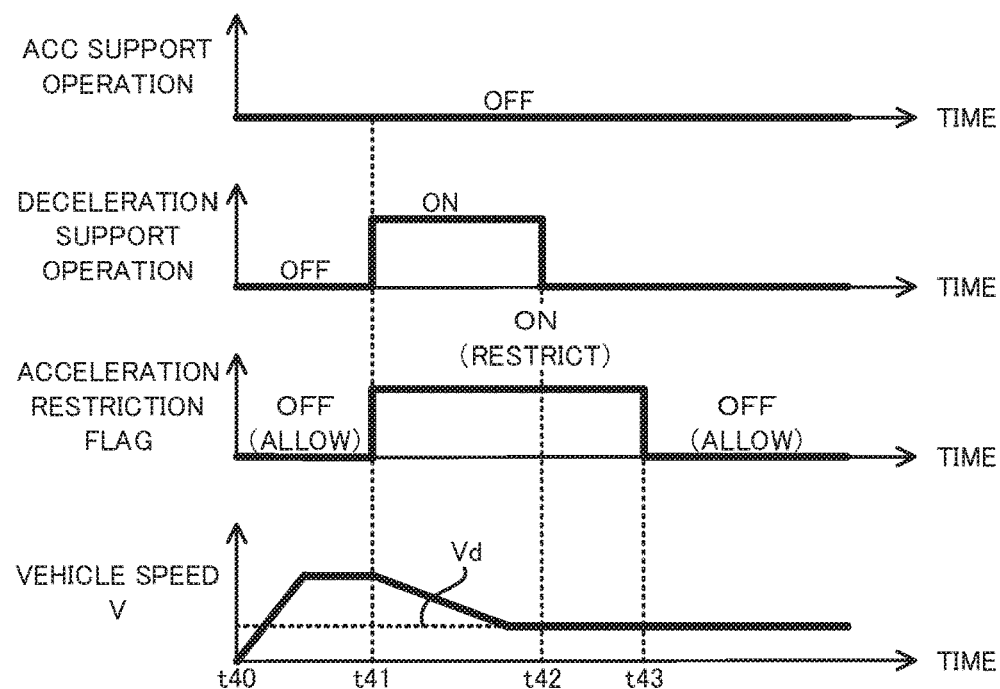

[FIG. 5]
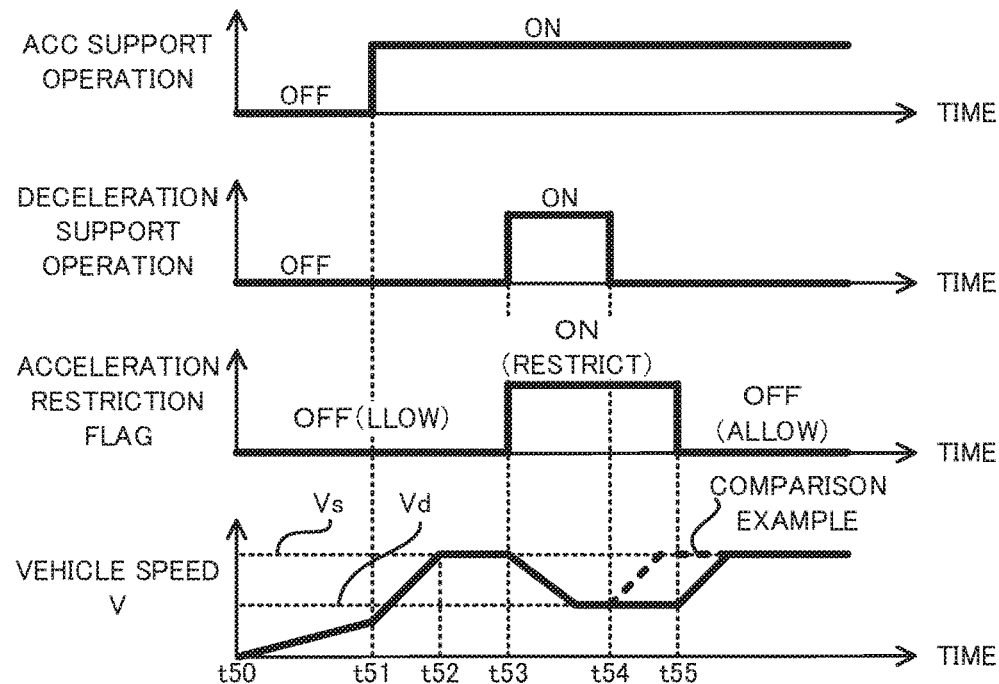
[FIG. 6]
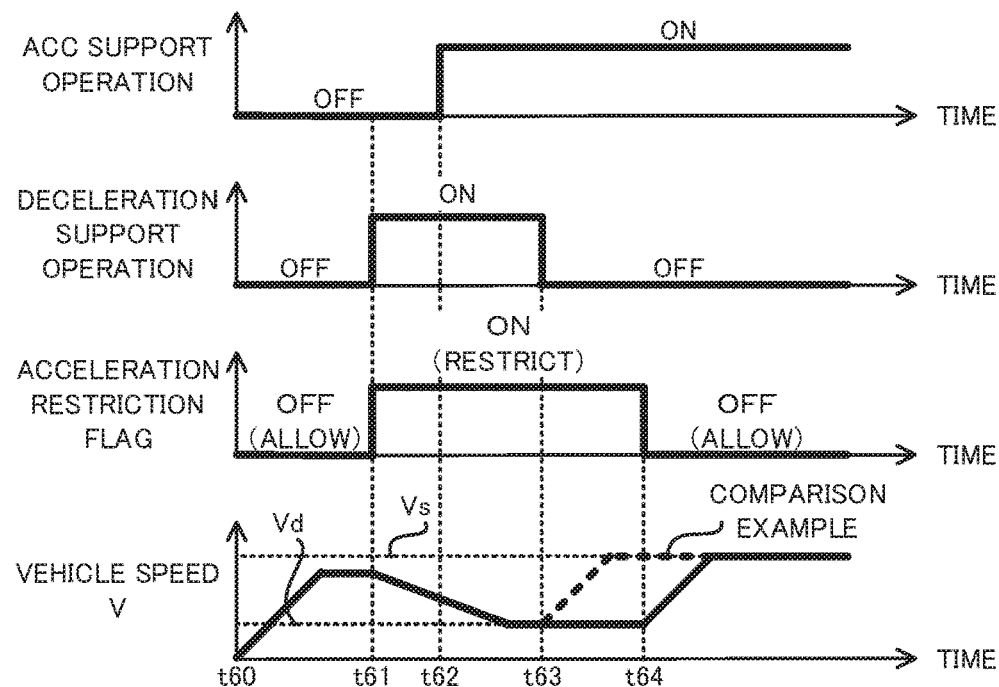

DRIVING SUPPORT APPARATUS

DESCRIPTION

Technical Field

The present invention relates to a technical field of a driving support apparatus that is configured to perform both of a driving support for automatically maintaining a speed of a vehicle and a driving support for automatically decelerating the vehicle, for example.

Background Art

There is known a driving support apparatus that is configured to perform a driving support for automatically decelerating a vehicle if a distance between the vehicle and a low speed driving point is equal to or less than a predetermined threshold value, wherein the low speed driving point is a point at which it is preferable that the vehicle stop, decelerate or move slow. For example, a Patent Literature 1 discloses a driving support apparatus that is configured to automatically decelerate the vehicle if the distance between the vehicle and a stop point or a slow driving start point is equal to or less than the predetermined threshold value and the vehicle is not in a decelerating condition.

CITATION LIST

Patent Literature

[Patent Literature 1] Japanese Unexamined Patent Application Publication No. 2008-006947

SUMMARY OF INVENTION

Technical Problem

There is known a driving support for automatically maintaining a speed of the vehicle (i.e. a vehicle speed), in addition to the driving support for automatically decelerating the vehicle. Each of a CC (Cruise Control) support and an ACC (Adaptive Cruise Control) support is one example of this driving support, for example. In the following description, for the convenience of explanation, the driving support for automatically maintaining the vehicle speed is referred to as a "first support" and the driving support for automatically decelerating the vehicle is referred to as a "second support".

If both of a first execution condition that should be satisfied to perform the first support and a second execution condition that should be satisfied to perform the second support are satisfied, it is preferable that the second support is prioritized more than the first support in order to ensure a safety of the driving by the vehicle. In this case, the second support decelerates the vehicle after the first support is suspended temporarily, and then the first support is re-started after the second support is completed. As a result, the vehicle that has been decelerated by the second support (especially, the vehicle that has been decelerated by the second support to the vehicle speed that is lower than a predetermined speed that should be maintained by the first support) is accelerated by the first support.

However, it is not necessarily preferable that the first support is re-started (namely, the vehicle starts to accelerate) immediately after the second support is completed. The reason is as follows. The second support is the driving support for decelerating the vehicle before the vehicle reaches the low speed driving point at which it is preferable that the vehicle stop, decelerate or move slow. Therefore, there is a high possibility that the vehicle is still at the low speed driving point immediately after the second support is completed. If the first support is re-started in this situation, the vehicle starts to accelerate immediately after the vehicle reaches the low speed driving point, although it is preferable that vehicle move relatively safely more because the vehicle is at the low speed driving point. Thus, there is a possibility that an appropriate driving (typically, a safe driving) of the vehicle may not be ensured depending on a surrounding circumstance of the vehicle if the vehicle accelerates.

The above described technical problem is one example of the technical problem to be solved by the present invention. It is therefore an object of the present invention to provide, for example, a driving support apparatus that is configured to allow a vehicle to move safe, if both of the execution condition for the first support for automatically maintaining the vehicle speed and the execution condition for the second support for automatically decelerating the vehicle.

Solution to Problem

<1>

One aspect of a driving support apparatus of the present invention has a controller, the controller is programmed to perform a first support if a first execution condition is satisfied, wherein the first support accelerates a vehicle, decelerates the vehicle or makes the vehicle to cruise so that a vehicle speed is maintained at a first speed, the controller is programmed to perform a second support if a second execution condition is satisfied, wherein the second execution condition is a condition that a distance between the vehicle and a low speed driving point is equal to or less than a predetermined threshold value, the low speed driving point is a point at which the vehicle preferably stops, decelerates or moves slow, and the second support automatically decelerates the vehicle so that the vehicle speed decreases to be equal to or lower than a second speed lower than the first speed before the vehicle reaches the low speed driving point, the controller is programmed (i) to perform the second support after forbidding acceleration of the vehicle by the first support, and then (ii) to keep forbidding the acceleration of the vehicle by the first support after the second support is completed and before a predetermined acceleration allowing condition is satisfied, and (iii) to allow the acceleration of the vehicle by the first support after the acceleration allowing condition is satisfied, if both of the first execution condition and the second execution condition are satisfied. Note that one aspect of a driving support apparatus of the present invention may have: a first supporting device that is configured to perform a first support if a first execution condition is satisfied, wherein the first support accelerates a vehicle, decelerates the vehicle or makes the vehicle to cruise so that a vehicle speed is maintained at a first speed; a second supporting device that is configured to perform a second support if a second execution condition is satisfied, wherein the second execution condition is a condition that a distance between the vehicle and a low speed driving point is equal to or less than a predetermined threshold value, the low speed driving point is a point at which the vehicle preferably stops, decelerates or moves slow, and the second support automatically decelerates the vehicle so that the vehicle speed decreases to be equal to or lower than a second speed lower than the first speed before the vehicle reaches the low speed driving point; and a controlling device that is configured (i) to allow the second supporting device to perform the second support after forbidding acceleration of the vehicle by the first support, and then (ii) to keep forbidding the acceleration of the vehicle by the first support after the second support is completed and before a predetermined acceleration allowing condition is satisfied, and (iii) to allow the acceleration of the vehicle by the first support after the acceleration allowing condition is satisfied, if both of the first execution condition and the second execution condition are satisfied.

According to one aspect of the driving support apparatus of the present invention, if both of the first execution condition and the second execution condition are satisfied, the vehicle decelerates by the second support after the vehicle is forbidden to accelerate by the first support. Then, the vehicle is kept to be forbidden to accelerate by the first support before the acceleration allowing condition is satisfied, even if the second support is completed (namely, the second support ends). Thus, the vehicle is allowed to travel safely more, compared to the case where the vehicle starts to accelerate by the first support immediately after the second support is completed. Namely, the driving support apparatus allows the vehicle to travel safely if both of the first execution condition and the second execution condition are satisfied.

<2>

In another aspect of the above described driving support apparatus, the acceleration allowing condition includes a first allowing condition that a driver of the vehicle performs an operation for accelerating the vehicle.

According to this aspect, it is presumed that the driver intends to accelerate the vehicle after confirming that surrounding circumstance of the vehicle is safe, if the first allowing condition is satisfied. Thus, the driving support apparatus allows the vehicle to travel safely.

<3>

In another aspect of the above described driving support apparatus, the second support is a driving support for decelerating the vehicle without stopping the vehicle so that the vehicle speed decreases to be equal to or lower than the second speed, the acceleration allowing condition includes a second allowing condition that the vehicle passes a specific point, wherein the specific point is a point which the vehicle should pass without accelerating after the vehicle reaches the low speed driving point.

According to this aspect, the acceleration allowing condition is not satisfied before the vehicle passes the specific point even if the second support is completed, and thus, the vehicle does not accelerate by the first support. Thus, the driving support apparatus allows the vehicle to travel safely

<4>

In another aspect of the above described driving support apparatus, the acceleration allowing condition includes a third allowing condition that a predetermined time elapses after the vehicle reaches the low speed driving point.

According to this aspect, the acceleration allowing condition is not satisfied before the predetermined time elapses even if the second support is completed, and thus, the vehicle does not accelerate by the first support. Thus, the driving support apparatus allows the vehicle to travel safely

<5>

In another aspect of the above described driving support apparatus, he second support is a driving support for decelerating the vehicle without stopping the vehicle so that the vehicle speed decreases to be equal to or lower than the second speed, the acceleration allowing condition includes a fourth allowing condition that the vehicle travels by a predetermined distance after the vehicle reaches the low speed driving point.

According to this aspect, the acceleration allowing condition is not satisfied before the vehicle travels by the predetermined distance even if the second support is completed, and thus, the vehicle does not accelerate by the first support. Thus, the driving support apparatus allows the vehicle to travel safely

BRIEF DESCRIPTION OF DRAWINGS

FIG. 1 is a block diagram that illustrates a structure of a vehicle in a present embodiment.

FIG. 2 is a flowchart that illustrates a flow of an intervening operation that is performed by an intervening unit in the present embodiment.

FIG. 3 is a timing chart that illustrates a temporal transition of a vehicle speed when an ACC execution condition is satisfied and a deceleration execution condition is not satisfied.

FIG. 4 is a timing chart that illustrates a temporal transition of a vehicle speed when the deceleration execution condition is satisfied and the ACC execution condition is not satisfied.

FIG. 5 is a timing chart that illustrates a temporal transition of a vehicle speed when the deceleration execution condition is newly satisfied during a period when the ACC execution condition is already satisfied.

FIG. 6 is a timing chart that illustrates a temporal transition of a vehicle speed when the ACC execution condition is newly satisfied during a period when the deceleration execution condition is already satisfied.

DESCRIPTION OF EMBODIMENTS

Hereinafter, with reference to drawings, one embodiment of the driving support apparatus of the present invention will be described. In the following description, a vehicle 1 to which one embodiment of the driving support apparatus of the present invention is adapted will be described.

(1) Structure of Vehicle 1

Firstly, with reference to FIG. 1, the structure of the vehicle 1 in the present embodiment will be explained. As illustrated in FIG. 1, the vehicle 1 has: a circumstance information obtaining unit 11; an ECU (Electronic Control Unit) 12 that is one example of the above described "driving support apparatus"; a power source 131; a brake actuator 132; a steering actuator 133; a shift actuator 134; a brake apparatus 142; a turned wheel 143; and a gear mechanism 144.

The circumstance information obtaining unit 11 obtains circumstance information that indicates surrounding circumstance of the vehicle 1. The circumstance information obtaining unit 11 may obtain the circumstance information by obtaining a result of detection by a detecting device of the vehicle 1. The detecting device includes at least one of a camera, a radar and a LIDAR (Light Detection and Ranging). The circumstance information obtaining unit 11 may obtain the circumstance information by communicating with a roadside device that is located on a road.

The ECU 12 is configured to control entire operation of the vehicle 1. The ECU 12 includes, as processing blocks that are logically realized in the ECU 12 or processing circuits that are physically realized in the ECU 12, an ACC (Adaptive Cruise Control) supporting unit 121 that is one example of the above described "first supporting device", a deceleration supporting unit 122 that is one example of the above described "second supporting device", and an intervening unit 123 that is one example of the above described "controlling device". The ACC supporting unit 121 is configured to perform an ACC support operation that is one example of the above described "first support" on the vehicle 1. The deceleration supporting unit 122 is configured to perform a deceleration support operation that is one example of the above described "second support" on the vehicle 1. The intervening unit 123 is configured to perform an intervention operation in order to prevent conflict between the ACC support operation and the deceleration support operation. Note that the ACC support operation, the deceleration support operation and the intervention operation will be described later in detail, and thus their detailed descriptions are omitted here.

The power source 131 is configured to supply driving power to a non-illustrated driving wheel (namely, at least one portion of wheels). The power source 131 includes at least one of an engine and a motor, for example. The power source 131 is configured to control (in other words, adjust) the driving power supplied to the driving wheel under the control of the ACC supporting unit 121 and the deceleration supporting unit 122. The brake actuator 132 is configured to control the brake apparatus 142 that is configured to brake the non-illustrated wheel in order to apply braking force to the vehicle 1 under the control of the ACC supporting unit 121 and the deceleration supporting unit 122. The steering actuator 133 is configured to turn the turned wheel 143 that can be turned (in other words, steered) in order to allow the vehicle 1 to move toward a predetermined direction under the control of the ACC supporting unit 121 and the deceleration supporting unit 122. The shift actuator 134 is configured to control the gear mechanism 144 that is configured to transmit the driving power from the power source 131 to the driving wheel in order to set a gear range of the gear mechanism (what we call a transmission) 144 into a desired gear range under the control of the ACC supporting unit 121 and the deceleration supporting unit 122.

(2) Operation of ECU 12

Next, the operations that are performed by the ECU 12 will be described. As described above, the ECU 12 performs the ACC support operation, the deceleration support and the intervention operation. Thus, the ACC support operation, the deceleration support and the intervention operation will be described in order.

(2-1) ACC Support Operation

The ACC support operation is a driving support operation for automatically maintaining (keeping) a vehicle speed V of the vehicle at a set speed Vs that is one example of the above described "first speed" without requiring an operation by a driver of the vehicle 1. Namely, the ACC support operation is a driving support operation for automatically accelerating the vehicle 1, decelerating the vehicle 1 or making the vehicle 1 cruise by automatically adjusting at least one of the driving power of the vehicle 1 and the braking force of the vehicle 1 so that the vehicle speed V is maintained at the set speed Vs. Specifically, the ACC supporting unit 121 performs the ACC support operation so that the vehicle 1 accelerates if the vehicle speed V is lower than the set speed Vs. The ACC supporting unit 121 performs the ACC support operation so that the vehicle 1 decelerates if the vehicle speed V is higher than the set speed Vs. The ACC supporting unit 121 performs the ACC support operation so that the vehicle 1 cruises (in other words, moves steadily) if the vehicle speed V is equal to the set speed Vs.

The ACC supporting unit 121 changes an aspect of the ACC support operation on the basis of a result of determination whether or not a preceding vehicle exist ahead of the vehicle 1 (specifically, ahead of the vehicle 1 along a moving direction of the vehicle 1, the same hereinafter). Specifically, if the preceding vehicle does not exist, the ACC supporting unit 121 performs the ACC support operation so that the vehicle speed V is maintained at the set speed Vs that is set by the driver. If the preceding vehicle exists and the set speed Vs that is set by the driver is lower than a vehicle speed of the preceding vehicle, the ACC supporting unit 121 performs the ACC support operation so that the vehicle speed V is maintained at the set speed Vs that is set by the driver. If the preceding vehicle exists and the set speed Vs that is set by the driver is higher than the vehicle speed of the preceding vehicle, the ACC supporting unit 121 performs the ACC support operation so that the vehicle speed V is maintained at the set speed Vs that is newly set by the ACC supporting unit 121 on the basis of the vehicle speed of the preceding vehicle and that is not higher than the set speed Vs that is set by the driver. In this case, the ACC supporting unit 121 may newly set the set speed Vs that is equal to the vehicle speed of the preceding vehicle in order to maintain a distance (what we call an inter-vehicular distance) between the vehicle 1 and the preceding vehicle at a constant distance.

The ACC supporting unit 121 performs the ACC support operation on the basis of the circumstance information obtained by the circumstance information obtaining unit 11. Thus, the circumstance information includes first information that is necessary for performing the ACC support operation. The first information includes information relating to the preceding vehicle that exists ahead of the vehicle 1 (for example, information indicating an existence of the preceding vehicle, the distance between the vehicle 1 and the preceding vehicle, the vehicle speed of the preceding vehicle and the like) and the like, for example.

The ACC supporting unit 121 performs the ACC support operation, if an ACC execution condition is satisfied. The ACC execution condition is a condition that the driver requests a start of the ACC support operation. The ACC execution condition is one example of the above described "first execution condition". After starting the ACC support operation, the ACC supporting unit 121 controls at least one of the power source 131, the brake actuator 132, the shift actuator 134 so that the vehicle speed V is automatically maintained at the set speed Vs. As a result, the vehicle speed V is automatically maintained at the set speed Vs, without requiring the operation of an acceleration pedal, a brake pedal and a shift lever (alternatively, a selector) by the driver.

(2-2) Deceleration Support Operation

The deceleration support operation is a driving support operation for automatically decelerating the vehicle 1 so that the vehicle speed V is decreased to be equal to or lower than a set speed Vd before the vehicle 1 reaches a low speed driving point, if the deceleration execution condition is satisfied. The low speed driving point is a point at which the vehicle 1 preferably stops, decelerates or moves slow. The deceleration execution condition is a condition that a distance between the vehicle 1 and the low speed driving point is equal to or less than a predetermined threshold value. The deceleration execution condition is one example of the above described "second execution condition". Moreover, the deceleration support operation in the present embodiment may be the deceleration support operation for decelerating the vehicle 1 to stop the vehicle 1 (namely, the deceleration support operation in which the set speed Vd is set to be zero). Alternatively, the deceleration support operation in the present embodiment may be the deceleration support operation for decelerating the vehicle 1 but not stopping the vehicle 1 (namely, the deceleration support operation in which the set speed Vd is set to be higher than zero).

Note that it is preferable that the deceleration supporting unit 122 performs the deceleration support operation for decelerating the vehicle 1 to stop the vehicle 1 if the deceleration execution condition that the distance between the vehicle 1 and the low speed driving point at which the vehicle 1 preferably moves slow is equal to or less than the predetermined threshold value. However, even in this case, the deceleration supporting unit 122 may perform the deceleration support operation for decelerating the vehicle 1 but not stopping the vehicle 1, if the vehicle 1 stops at the low speed driving point by the operation of the driver.

The low speed driving point includes a first point at which a law requires the vehicle 1 to stop, decelerate or move slow. A point at which a road sign or a signal requires the vehicle 1 to stop, decelerate or move slow is one example of the first point, for example. Note that the road sign in the present embodiment includes not only a sign (for example, a display panel) that is located on a road but also a sign (for example, a road marking) that is painted on the road. The low speed driving point may include a second point at which the vehicle 1 preferably stops, decelerates or moves slow in order to ensure traffic safety regardless of the law, in addition to or instead of the first point. A point at which there is a relatively high possibility that a pedestrian runs into the road (for example, a point at which a crosswalk is painted on the road, a point at which a bus stop is located, a road adjacent a school and the like) is one example of the second point. A point at which it is relatively difficult for the driver to see the circumstance ahead of the vehicle 1 (for example, a curved road, an intersection and the like) is one example of the second point. The low speed driving point may include a third point at which the vehicle 1 preferably stops, decelerates or moves slow in order to prevent collision with an object (for example, the preceding vehicle, the pedestrian, an obstacle and the like) that exists ahead of the vehicle 1, in addition to or instead of at least one of the first point and the second point. A point at which it is predicted that the vehicle 1 may collide against the object that exists ahead of the vehicle 1 if the vehicle 1 keeps traveling is one example of the third point.

The deceleration supporting unit 122 performs the deceleration support operation on the basis of the circumstance information obtained by the circumstance information obtaining unit 11. Thus, the circumstance information includes second information that is necessary for performing the deceleration support operation. The second information includes information relating to the road sign that exists ahead of the vehicle 1 (for example, information indicating an existence of the road sign, a content of the road sign and the like), information relating to the signal that exists ahead of the vehicle 1 (for example, information indicating an existence of the signal, a color of the signal and the like), information indicating a shape (in other words, an alignment) of the road that exists ahead of the vehicle 1, information relating to a structure (in other words, an architectural structure) that is located around the road existing ahead of the vehicle 1 (for example, information indicating an existence of the structure, a distance between the structure and the vehicle 1, a shape of the structure and the like), information relating to the object that exists ahead of the vehicle 1 (for example, information indicating an existence of the object, a distance between the object and the vehicle 1, a speed of the object and the like) and the like, for example.

In order to perform the deceleration support operation, the deceleration supporting unit 122 determines on the basis of the circumstance information whether or not the distance between the vehicle 1 and the low speed driving point is equal to or less than the predetermined threshold value. Specifically, the deceleration supporting unit 122 determines whether or not the circumstance information obtaining unit 11 obtains the circumstance information indicating that the low speed driving point exists. If the circumstance information obtaining unit 11 obtains the circumstance information indicating that the low speed driving point exists, the deceleration supporting unit 122 calculates the distance between the vehicle 1 and the low speed driving point on the basis of the circumstance information. Then, the deceleration supporting unit 122 determines whether or not the distance between the vehicle 1 and the low speed driving point is equal to or less than the predetermined threshold value.

If it is determined that the distance between the vehicle 1 and the low speed driving point is equal to or less than the predetermined threshold value, the deceleration execution condition is satisfied. Thus, the deceleration supporting unit 122 starts the deceleration support operation. Specifically, the deceleration supporting unit 122 calculates a deceleration rate that is necessary for making the vehicle speed V be equal to or lower than the set speed Vd before the vehicle 1 reaches the low speed driving point. The deceleration supporting unit 122 controls at least one of the power source 131, the brake actuator 132, and the shift actuator 134 so that the vehicle 1 automatically decelerates by the calculated deceleration rate. As a result, the vehicle speed V automatically decreases so that the vehicle speed V becomes equal to or lower than the set speed Vd before the vehicle 1 reaches the low speed driving point, without requiring the operation of an acceleration pedal, a brake pedal and a shift lever (alternatively, a selector) by the driver.

If the calculated deceleration rate is zero (alternatively, less than zero), it is predicted that the vehicle speed V becomes equal to or lower than the set speed Vd before the vehicle 1 reaches the low speed driving point without the vehicle 1 decelerating. Thus, in this case, the deceleration supporting unit 122 may terminate the deceleration support operation that has started due to the determination that the distance between the vehicle 1 and the low speed driving point is equal to or less than the predetermined threshold value.

(2-3) Intervention Operation

The above described ACC support operation and the deceleration support operation are performed separately and independently. Namely, the ACC supporting unit 121 performs the ACC support operation if the ACC execution condition is satisfied, without considering whether or not the deceleration supporting unit 122 performs the deceleration support operation. Moreover, the deceleration supporting unit 122 performs the deceleration support operation if the deceleration execution condition is satisfied, without considering whether or not the ACC supporting unit 121 performs the ACC support operation.

Here, if the ACC execution condition is satisfied and the deceleration execution condition is not satisfied, the ACC support operation is performed and the deceleration support operation is not performed. Thus, the vehicle 1 travels in accordance with the ACC support operation. As a result, the vehicle 1 travels so that the vehicle speed V is maintained at the set speed Vs. Moreover, if the ACC execution condition is not satisfied and the deceleration execution condition is satisfied, the ACC support operation is not performed and the deceleration support operation is performed. Thus, the vehicle 1 travels in accordance with the deceleration support operation. As a result, the vehicle 1 travels so that the vehicle speed V becomes equal to or lower than the set speed Vd.

On the other hand, if the deceleration execution condition is newly satisfied during a period when the ACC execution condition is satisfied, the deceleration supporting unit 122 newly starts the deceleration support operation during a period when the ACC supporting unit 121 already performs the ACC support operation. Moreover, if the ACC execution condition is newly satisfied during a period when the deceleration execution condition is satisfied, the ACC supporting unit 121 newly starts the ACC support operation during a period when the deceleration supporting unit 122 already performs the deceleration support operation. Moreover, if both of the ACC execution condition and the deceleration execution condition are newly satisfied simultaneously, the ACC supporting unit 121 and the deceleration supporting unit 122 simultaneously start the ACC support operation and the deceleration support operation, respectively. In this case, the ACC support operation tries to maintain the vehicle speed V at the set speed Vs and the deceleration support operation tries to make the vehicle speed V be equal to or lower than the set speed Vd. Therefore, there is a conflict between the ACC support operation and the deceleration support operation. Especially, if the set speed Vd is lower than the set speed Vs, the ACC support operation for maintaining the vehicle speed V at the set speed Vs that is higher than the set speed Vd contradicts the deceleration support operation for making the vehicle speed V be equal to or lower than the set speed Vd that is lower than the set speed Vs. Thus, the intervening unit 123 performs the following intervention operation in order to prevent the conflict (alternatively, the contradiction) between the ACC support operation and the deceleration support operation.

Incidentally, if the set speed Vd is higher than the set speed Vs, the

ACC support operation for maintaining the vehicle speed V at the set speed Vs may not contradict the deceleration support operation for making the vehicle speed V be equal to or lower than the set speed Vd, theoretically. This is because the vehicle speed V maintained at the set speed Vs by the ACC support operation is lower than the set speed Vd that is a target speed of the deceleration support operation. However, in the present embodiment, the intervening unit 123 performs the following intervention operation, even when the set speed Vd is higher than the set speed Vs.

Moreover, if one of the ACC execution condition and the deceleration execution condition is satisfied and the other one of the ACC execution condition and the deceleration execution condition is not satisfied, one of the ACC support operation and the deceleration support operation is performed and the other one of the ACC support operation and the deceleration support operation is not performed. Thus, there is no conflict between the ACC support operation and the deceleration support operation. However, in the present embodiment, the intervening unit 123 performs the following intervention operation, even when one of the ACC execution condition and the deceleration execution condition is satisfied and the other one of the ACC execution condition and the deceleration execution condition is not satisfied. However, the intervention operation performed in this case corresponds to the operation for allowing one of the ACC support operation and the deceleration support operation to be performed in the case where one of the ACC execution condition and the deceleration execution condition is satisfied, rather than the operation for preventing the conflict between the ACC support operation and the deceleration support operation.

In the following description, with reference to FIG. 2, a flow of the intervention operation that is performed by the intervening unit 123 will be described. FIG. 2 is a flowchart that illustrates the flow of the intervention operation that is performed by the intervening unit 123. Note that the intervention operation illustrated in FIG. 2 is performed repeatedly by a predetermined cycle.

As illustrated in FIG. 2, the intervening unit 123 determines whether or not the deceleration execution operation is satisfied (a step S11). Namely, the intervening unit 123 determines whether or not the deceleration supporting unit 123 performs the deceleration support operation (the step S11).

As a result of the determination at the step S11, if it is determined that the deceleration execution operation is satisfied (the step S11: Yes), the intervening unit 123 sets an acceleration restriction flag to be ON (a step S12). The intervening unit 123 restricts (specifically, forbids) the acceleration of the vehicle 1 by the ACC support operation during a period when the acceleration restriction flag is set to be ON. Thus, even if the ACC supporting unit 121 performs the ACC support operation (especially, the ACC supporting unit 121 performs the ACC support operation for accelerating the vehicle 1) during a period when the deceleration execution condition is satisfied (namely, the deceleration support operation is performed), the ACC support operation does not accelerates the vehicle 1. Namely, the deceleration support operation is substantially performed more preferentially than the ACC support operation.

On the other hand, as a result of the determination at the step S11, if it is determined that the deceleration execution operation is not satisfied (the step S11: No), the intervening unit 123 determines whether or not the acceleration restriction flag is set to be ON (a step S13). Namely, the intervening unit 123 determines whether or not the acceleration of the vehicle 1 by the ACC support operation that has been restricted during the period when the deceleration supporting operation has been performed is still kept to be restricted even after the deceleration support operation is completed (namely, the deceleration support operation ends).

As a result of the determination at the step S13, if it is determined that the acceleration restriction flag is set to be ON (namely, the acceleration of the vehicle 1 by the ACC support operation is restricted) (the step S13: Yes), the intervening unit 123 determines whether or not an acceleration allowing condition is satisfied (a step S14). The acceleration allowing condition is a condition that should be satisfied to allow the acceleration of the vehicle 1 by the ACC support operation that has been restricted. In the present embodiment, the acceleration allowing condition includes a first allowing condition that the driver performs an operation for accelerating the vehicle 1. The operation for accelerating the vehicle 1 includes an operation of pedaling the acceleration pedal, for example.

As a result of the determination at the step S14, if it is determined that the acceleration allowing condition is not satisfied (the step S14: No), the intervening unit 123 maintains the acceleration restriction flag to be ON and keeps restricting the acceleration of the vehicle 1 by the ACC support operation (the step S12). Namely, even after the deceleration support operation that has been performed with the acceleration of the vehicle 1 by the ACC support operation being restricted is completed, the acceleration of the vehicle 1 by the ACC support operation keeps to be respected before the acceleration allowing condition is satisfied. Therefore, even if the ACC supporting unit 121 performs the ACC support operation (especially, the ACC support operation for accelerating the vehicle 1) after the deceleration support operation is completed, the ACC support operation does not accelerate the vehicle 1 before the acceleration allowing condition is satisfied. Thus, the vehicle 1 keeps traveling (alternatively, keeps stopping) in a condition where the deceleration of the vehicle 1 by the deceleration support operation is completed). Namely, the vehicle 1 does not accelerate immediately after the deceleration support operation is completed.

On the other hand, as a result of the determination at the step S14, if it is determined that the acceleration allowing condition is satisfied (the step S14: Yes), the intervening unit 123 sets the acceleration restriction flag to be OFF (a step S15). The intervening unit 123 allows the acceleration of the vehicle 1 by the ACC support operation during a period when the acceleration restriction flag is set to be OFF. Namely, after the deceleration support operation that has been performed with the acceleration of the vehicle 1 by the ACC support operation being restricted is completed, the acceleration of the vehicle 1 by the ACC support operation is allowed after the acceleration allowing condition is satisfied. Thus, if the ACC supporting unit 121 performs the ACC support operation (especially, the ACC support operation for accelerating the vehicle 1) after the acceleration allowing condition is satisfied, the ACC support operation accelerates the vehicle 1

On the other hand, as a result of the step S13, if it is determined that the acceleration restriction flag is not set to be ON (namely, the acceleration of the vehicle 1 by the ACC support operation is not restricted) (the step S13: No), the ACC support operation is probably allowed to accelerate the vehicle 1. Thus, the intervening unit 123 maintains the acceleration allowing flag to be OFF and keeps allowing the acceleration of the vehicle 1 by the ACC support operation (the step S15).

(3) Specific Example of Intervention Operation

Next, specific examples of the intervention operation for preventing the conflict between the ACC support operation and the deceleration support operation will be described. Note that the intervention operation in the present embodiment is performed not only when both of the ACC execution condition and the deceleration execution condition are satisfied but also when one of the ACC execution condition and the deceleration execution condition is satisfied and the other one of the ACC execution condition and the deceleration execution condition is not satisfied. Thus, in the following description, (i) a specific example of the intervention operation that is performed when the ACC execution condition is satisfied and the deceleration execution condition is not satisfied, (ii) a specific example of the intervention operation that is performed when the ACC execution condition is not satisfied and the deceleration execution condition is satisfied, (iii) a specific example of the intervention operation that is performed when the deceleration execution condition is newly satisfied during a period when the ACC execution condition is already satisfied and (iv) a specific example of the intervention operation that is performed when the ACC execution condition is newly satisfied during a period when the deceleration execution condition is already satisfied will be described in order.

(3-1) Intervention Operation when ACC Execution Condition is Satisfied and Deceleration Execution Condition is not Satisfied Firstly, with reference to FIG. 3, the specific example of the intervention operation that is performed when the ACC execution condition is satisfied and the deceleration execution condition is not satisfied will be described. FIG. 3 is a timing chart that illustrates a temporal transition of the vehicle speed V when the ACC execution condition is satisfied and the deceleration execution condition is not satisfied.

As illustrated in FIG. 3, the vehicle starts to travel (move) at a time t30. The intervening unit 123 determines that the deceleration execution condition is not satisfied (the step S11 in FIG. 2: No) and the acceleration of the vehicle 1 by the ACC support operation is not restricted (the step S13 in FIG. 2: No) at the time t30. Therefore, the intervening unit 123 allows the acceleration of the vehicle 1 by the ACC support operation after the time t30.

Then, the driver requests the start of the ACC support operation at a time t31. As a result, the ACC execution condition is newly satisfied and the ACC support operation is started at the time t31. The intervening unit 123 determines that the deceleration execution condition is not satisfied (the step S11 in FIG. 2: No) and the acceleration of the vehicle 1 by the ACC support operation is not restricted (the step S13 in FIG. 2: No) at the time t31. Therefore, the intervening unit 123 allows the acceleration of the vehicle 1 by the ACC support operation after the time t31. Thus, the vehicle speed V is maintained at the set speed Vs by the ACC support operation after the time t31. Note that FIG. 3 illustrates an example in which the ACC support operation increases the vehicle speed V (namely, the vehicle 1 accelerates) from the time t31 to a time t32 and the ACC support operation maintains the vehicle speed V at the set speed Vs (namely, the vehicle 1 cruises or moves steady) after the time t32, because the vehicle speed V is lower than the set speed Vs from the time t31 to the time t32 and the vehicle speed V is equal to the set speed Vs after the time t32.

(3-2) Intervention Operation when ACC Execution Condition is not Satisfied and Deceleration Execution Condition is Satisfied Next, with reference to FIG. 4, the specific example of the intervention operation that is performed when the ACC execution condition is not satisfied and the deceleration execution condition is satisfied will be described. FIG. 4 is a timing chart that illustrates a temporal transition of the vehicle speed V when the ACC execution condition is not satisfied and the deceleration execution condition is satisfied.

As illustrated in FIG. 4, the vehicle starts to travel (move) at a time t40. The intervening unit 123 determines that the deceleration execution condition is not satisfied (the step S11 in FIG. 2: No) and the acceleration of the vehicle 1 by the ACC support operation is not restricted (the step S13 in FIG. 2: No) at the time t40. Therefore, the intervening unit 123 allows the acceleration of the vehicle 1 by the ACC support operation after the time t40.

Then, it is determined that the distance between the vehicle 1 and the low speed driving point is equal to or less than the predetermined threshold value at a time t41. As a result, the deceleration execution condition is newly satisfied and the deceleration support operation is started at the time t41. The intervening unit 123 determines that the deceleration execution condition is satisfied (the step S11 in FIG. 2: Yes) at the time t41. Therefore, the intervening unit 123 restricts the acceleration of the vehicle 1 by the ACC support operation after the time t41. However, in the example illustrated in FIG. 4, the ACC support operation is not started after the time t41. Thus, after the time t41, the vehicle speed V decreases by the deceleration support operation after the time t41 so that the vehicle speed V becomes equal to or lower than the set speed Vd before a time t42 at which the vehicle 1 reaches the low speed driving point.

When the vehicle 1 reaches the low speed driving point at the time t42, the deceleration support operation is completed. The intervening unit 123 determines that the deceleration execution condition is not satisfied (the step S11 in FIG. 2: No), the acceleration of the vehicle 1 by the ACC support operation is restricted (the step S13 in FIG. 2: Yes) and the acceleration allowing condition is not satisfied (the step S14 in FIG. 2: No) at the time t42. Thus, the intervening unit 123 keeps restricting the acceleration of the vehicle 1 by the ACC support operation after the t42 at which the deceleration support operation is completed.

Then, the driver performs the operation for accelerating the vehicle 1 at a time t43. As a result, the intervening unit 123 determines that the deceleration execution condition is not satisfied (the step S11 in FIG. 2: No), the acceleration of the vehicle 1 by the ACC support operation is restricted (the step S13 in FIG. 2: Yes) and the acceleration allowing condition is satisfied (the step S14 in FIG. 2: Yes) at the time t43. Thus, the intervening unit 123 allows the acceleration of the vehicle 1 by the ACC support operation after the time t43. However, in the example illustrated in FIG. 4, the ACC support operation is not started after the time t43.

(3-3) Intervention Operation when Deceleration Execution Condition is Newly Satisfied During a Period when ACC Execution Condition is Already Satisfied Next, with reference to FIG. 5, the specific example of the intervention operation that is performed when the deceleration execution condition is newly satisfied during the period when the ACC execution condition is already satisfied will be described. FIG. 5 is a timing chart that illustrates a temporal transition of the vehicle speed V when the deceleration execution condition is newly satisfied during the period when the ACC execution condition is already satisfied will be described.

As illustrated in FIG. 5, the vehicle starts to travel (move) at a time t50, the driver requests the start of the ACC support operation (namely, the ACC execution condition is newly satisfied and the ACC support operation is started) at a time t51 and the vehicle speed V is equal to the set speed Vs at a time t52. The intervening operation that is performed from the time t50 to the time t52 is same as the intervening operation that is performed from the time t30 to the time t32 (see FIG. 3).

Then, it is determined that the distance between the vehicle 1 and the low speed driving point is equal to or less than the predetermined threshold value at a time t53 at which the ACC support operation maintains the vehicle speed V. As a result, the deceleration execution condition is newly satisfied at the time t53. The intervening unit 123 determines that the deceleration execution condition is satisfied (the step S11 in FIG. 2: Yes) at the time t53. Therefore, the intervening unit 123 restricts the acceleration of the vehicle 1 by the ACC support operation after the time t53. Thus, the vehicle speed V decreases by the deceleration support operation after the time t53 so that the vehicle speed V becomes equal to or lower than the set speed Vd before a time t54 at which the vehicle 1 reaches the low speed driving point.

FIG. 5 illustrates an example in which the set speed Vs is higher than the set speed Vd. In this case, the vehicle speed V is equal to or lower than the set speed Vd that is lower than the set speed Vs after the time t53. Thus, the ACC supporting unit 121 tries to perform the ACC support operation for accelerating the vehicle 1. However, since the acceleration of the vehicle 1 by the ACC support operation is restricted, the vehicle 1 does not accelerate by the ACC support operation.

When the vehicle 1 reaches the low speed driving point at the time t54, the deceleration support operation is completed. The intervening unit 123 determines that the deceleration execution condition is not satisfied (the step S11 in FIG. 2: No), the acceleration of the vehicle 1 by the ACC support operation is restricted (the step S13 in FIG. 2: Yes) and the acceleration allowing condition is not satisfied (the step S14 in FIG. 2: No) at the time t42. Thus, the intervening unit 123 keeps restricting the acceleration of the vehicle 1 by the ACC support operation after the t54 at which the deceleration support operation is completed.

Then, the driver performs the operation for accelerating the vehicle 1 at a time t55. As a result, the intervening unit 123 determines that the deceleration execution condition is not satisfied (the step S11 in FIG. 2: No), the acceleration of the vehicle 1 by the ACC support operation is restricted (the step S13 in FIG. 2: Yes) and the acceleration allowing condition is satisfied (the step S14 in FIG. 2: Yes) at the time t55. Thus, the intervening unit 123 allows the acceleration of the vehicle 1 by the ACC support operation after the time t55. As a result, the vehicle 1 accelerates by the ACC support operation after the time t55.

(3-4) Intervention Operation when ACC Execution Condition is Newly Satisfied During a Period when Deceleration Execution Condition is Already Satisfied Next, with reference to FIG. 6, the specific example of the intervention operation that is performed when the ACC execution condition is newly satisfied during the period when the deceleration execution condition is already satisfied will be described. FIG. 6 is a timing chart that illustrates a temporal transition of the vehicle speed V when the ACC execution condition is newly satisfied during the period when the deceleration execution condition is already satisfied will be described.

As illustrated in FIG. 6, the vehicle starts to travel (move) at a time t60 and it is determined that the distance between the vehicle 1 and the low speed driving point is equal to or less than the predetermined threshold value (namely, the deceleration execution condition is newly satisfied and the deceleration support operation is started) at a time t61. The intervening operation that is performed from the time t60 to the time t61 is same as the intervening operation that is performed from the time t40 to the time t41 (see FIG. 4).

When the driver requests the start of the ACC support operation at a time t62 at which the vehicle 1 decelerates by the deceleration support operation. As a result, the ACC execution condition is newly satisfied and the ACC support operation is started at the time t62. The intervening unit 123 determines that the deceleration execution condition is satisfied (the step S11 in FIG. 2: Yes) at the time t62. Therefore, the intervening unit 123 keeps restricting the acceleration of the vehicle 1 by the ACC support operation after the t62 at which the ACC execution condition is newly satisfied. Thus, the vehicle 1 decelerates by the deceleration support operation after the time t62. As a result, the vehicle speed V decreases so that the vehicle speed V becomes equal to or lower than the set speed Vd before a time t63 at which the vehicle 1 reaches the low speed driving point.

FIG. 6 illustrates an example in which the set speed Vs is higher than the set speed Vd. In this case, the vehicle speed V is equal to or lower than the set speed Vd that is lower than the set speed Vs after the time t62. Thus, the ACC supporting unit 121 tries to perform the ACC support operation for accelerating the vehicle 1. However, since the acceleration of the vehicle 1 by the ACC support operation is restricted, the vehicle 1 does not accelerate by the ACC support operation.

When the vehicle 1 reaches the low speed driving point at the time t63, the deceleration support operation is completed. The intervening operation that is performed from the time t63 at which the deceleration support operation is completed to a time t64 at which the driver performs the operation for accelerating the vehicle 1 is same as the intervening operation that is performed from the time t54 to the time t55 (see FIG. 5). Therefore, even if the ACC execution condition is newly satisfied during the period when the deceleration execution condition is already satisfied, the acceleration of the vehicle 1 by the ACC support operation is allowed after the deceleration support operation is completed and the acceleration allowing condition is satisfied.

(4) Technical Effect

As described above, according to the vehicle 1 in the present embodiment, if both of the ACC execution condition and the deceleration execution condition are satisfied, the acceleration of the vehicle 1 by the ACC support operation is restricted and then the deceleration support operation decelerates the vehicle 1. Then, even after the deceleration support operation is completed, the acceleration of the vehicle 1 by the ACC support operation is restricted before the acceleration allowing condition is satisfied. Thus, the vehicle 1 is allowed to travel safely more, compared to the case where the vehicle starts to accelerate by the ACC support operation immediately after the deceleration support operation is completed (namely, immediately after the vehicle 1 reaches the low speed driving point).

Especially in the present embodiment, the acceleration of the vehicle 1 by the ACC support operation keeps to be restricted before the driver performs the operation for accelerating the vehicle 1, even after the deceleration support operation is completed. Here, the driver usually intends to accelerate the vehicle 1 after confirming that surrounding circumstance of the vehicle is safe. Thus, the vehicle 1 is allowed to travel safely, because the vehicle 1 is allowed to accelerate under assumption that the driver already confirms that surrounding circumstance of the vehicle is safe.

Note that the fourth graph in each of FIG. 5 and FIG. 6 illustrates, by using a thick dashed line, temporal transition of the vehicle speed V when the intervening operation in the comparison example is performed. The intervening operation in the comparison example allows the acceleration of the vehicle 1 by the ACC support operation after the deceleration support operation. In the comparison example, the vehicle 1 starts to accelerate at the time t54 (alternatively, the time 63, the same hereinafter) at which the deceleration support operation is completed. However, the vehicle 1 is still at the low speed driving point at the time t54. Especially, the vehicle 1 just reaches the low speed driving point at the time t54. Thus, in the comparison example, the vehicle 1 starts to accelerate immediately after the vehicle 1 reaches the low speed driving point. However, the low speed driving point is the point at which the vehicle 1 preferably stops, decelerates or moves slow. Thus, it is not necessarily preferable (typically, safe) that the vehicle 1 starts to accelerate immediately after the vehicle 1 reaches the low speed driving point. On the other hand, in the present embodiment, the vehicle 1 does not start to accelerate before the acceleration allowing condition is satisfied, even after the deceleration support operation is completed (namely, even after the vehicle 1 reaches the low speed driving point). Therefore, in the present embodiment, the vehicle 1 is allowed to travel safely more, compared to the comparison example.

For example, a situation in which the low speed driving point is an intersection (especially, an intersection which has no signal and at which it is relatively difficult for the driver to see the circumstance ahead of the vehicle 1) and the deceleration support operation is the deceleration support operation for decelerating (but not stopping) the vehicle 1 before the vehicle 1 reaches the intersection will be described. In the comparison example, if both of the ACC support operation and the deceleration support operation are performed in this situation, the vehicle 1 decelerates by the deceleration support operation before the vehicle 1 enters the intersection and then the vehicle 1 starts to accelerate immediately after the vehicle 1 enters the intersection. Therefore, in the comparison example, the accelerating vehicle 1 enters the intersection at which it is relatively difficult for the driver to see the circumstance ahead of the vehicle 1. This is not necessarily a preferable driving. On the other hand, in the present embodiment, the vehicle 1 enters the intersection in the decelerated condition (namely, at a relatively low speed). Thus, the vehicle 1 is allowed to enter the intersection more safely, compared to the comparison example. Moreover, the driver has more time to confirm the safety of the intersection and to prevent danger, and this contributes the safe driving of the vehicle 1.

(5) Modified Example

In the above described description, the acceleration allowing condition includes the first allowing condition that the driver performs an operation for accelerating the vehicle 1. However, the acceleration allowing condition may include another allowing condition that is different from the first allowing condition, in addition to or instead of the first allowing condition. In this case, if at least one of the first allowing condition and another allowing condition is satisfied, the acceleration of the vehicle 1 by the ACC support operation is allowed. In the following description, one example of another allowing condition included in the acceleration allowing condition will be described.

The acceleration allowing condition may include a second allowing condition that the vehicle 1 passes a specific point that is set on the basis of the low speed driving point. The specific point is a point which the vehicle 1 preferably passes without accelerating (in other words, in the decelerated condition or at the vehicle speed V that is lower than the set speed Vs) after the vehicle 1 reaches the low speed driving point. In other words, the specific point corresponds to an end point of a traveling section which the vehicle 1 should travel from the low speed driving point that is a start point of the traveling section without accelerating after the vehicle 1 reaches the low speed driving point. The specific point may be set to a point which the vehicle 1 preferably travels to reach without accelerating in order to travel safely after the vehicle 1 reaches the low speed driving point. Alternatively, the specific point may be set from a viewpoint of ensuring the safe driving of the vehicle 1 in the case where the vehicle 1 starts to accelerate by the ACC support operation at a timing when the vehicle 1 reaches the specific point.

For example, if the entrance of the intersection (for example, a point at which one road starts to intersect with another road, wherein one road is a road on which the vehicle 1 travels) is the low speed driving point, a center point of the intersection may be set to the specific point. This is because the driver or the driving support apparatus can recognize the situation in the intersection during a period when the decelerated vehicle 1 (i.e. the vehicle 1 decelerated by the deceleration support operation) is allowed to travel to the center point of the intersection without accelerating, if the center point of the intersection is set to the specific point. For example, the crosswalk is the low speed driving point, a point ahead of the crosswalk may be set to the specific point. This is because the decelerated vehicle 1 (i.e. the vehicle 1 decelerated by the deceleration support operation) is allowed to pass the crosswalk without accelerating, if the point ahead of the crosswalk may be set to the specific point. For the same reason, if the road adjacent to the school is the low speed point, a point ahead of this road may be set to the specific point.

The acceleration allowing condition may include a third allowing condition that a predetermined time elapses after the vehicle 1 reaches the low speed driving point. In this case, the vehicle 1 does not accelerate by the ACC support operation before the predetermined time elapses after the deceleration support operation is completed. Thus, the vehicle 1 travels by some distance in the decelerated condition. Therefore, the vehicle 1 is allowed to travel safely more, compared to the comparison example. In addition, the intervening unit 123 need not set the specific point and determine on the basis of the circumstance information whether or not the vehicle 1 passes the specific point, in contrast to the case where the above described second allowing condition is used. Therefore, a processing load of the intervening unit 123 can be reduced.

The predetermined time may be a traveling time for which the decelerated vehicle 1 (i.e. the vehicle 1 decelerated by the deceleration support operation) preferably travels without accelerating (specifically, in order to ensure the safe driving of the vehicle 1) after the vehicle 1 reaches the low speed driving point. The predetermined time may be an elapsed time for which the stopping vehicle 1 (i.e. the vehicle 1 stopped by the deceleration support operation) preferably keeps stopping (specifically, in order to ensure the safe driving of the vehicle 1) after the vehicle 1 reaches the low speed driving point. The predetermined time may be set from a viewpoint of ensuring the safe driving of the vehicle 1 in the case where the vehicle 1 starts to accelerate by the ACC support operation after the predetermined time elapses.

The acceleration allowing condition may include a fourth allowing condition that the vehicle 1 travels by a predetermined distance after the vehicle 1 reaches the low speed driving point. In this case, the vehicle 1 does not accelerate by the ACC support operation before the vehicle 1 travels by the predetermined distance after the deceleration support operation is completed. Thus, the vehicle 1 travels for some time in the decelerated condition. Therefore, the vehicle 1 is allowed to travel safely more, compared to the comparison example. In addition, the intervening unit 123 need not set the specific point and determine on the basis of the circumstance information whether or not the vehicle 1 passes the specific point, in contrast to the case where the above described second allowing condition is used. Therefore, a processing load of the intervening unit 123 can be reduced.

The predetermined distance may be a traveling distance by which the decelerated vehicle 1 (i.e. the vehicle 1 decelerated by the deceleration support operation) preferably travels without accelerating (specifically, in order to ensure the safe driving of the vehicle 1) after the vehicle 1 reaches the low speed driving point. The predetermined distance may be set from a viewpoint of ensuring the safe driving of the vehicle 1 in the case where the vehicle 1 starts to accelerate by the ACC support operation after the vehicle 1 travels by the predetermined distance Note that each of the second allowing condition and the fourth allowing condition premises that the vehicle 1 keeps traveling after the vehicle 1 reaches the low speed driving point. Thus, it is preferable that each of the second allowing condition and the fourth allowing condition be used when the deceleration support operation for decelerating the vehicle 1 but not stopping the vehicle 1 is performed. In addition, it is preferable that each of the second allowing condition and the fourth allowing condition be used when the low speed driving point is a point at which the law does not necessarily require the vehicle 1 to stop.

In the above description, the deceleration supporting unit 122 determines on the basis of the circumstance information obtained by the circumstance information obtaining unit 11 whether or not the distance between the vehicle 1 and the low speed driving point is equal to or less than the predetermined threshold value. However, the deceleration supporting unit 122 may determine on the basis of current position of the vehicle 1 and a map database whether or not the distance between the vehicle 1 and the low speed driving point is equal to or less than the predetermined threshold value. The existing operation (for example, the operation described in the above described Patent Literature 1) may be used as the operation of determining on the basis of the current position of the vehicle 1 and the map database whether or not the distance between the vehicle 1 and the low speed driving point is equal to or less than the predetermined threshold value, and thus its detailed description is omitted.

The ACC supporting unit 121 may perform a CC (Cruise Control) support operation, instead of the above described ACC support operation. The CC support operation is same as the ACC support operation in that the CC support operation is a driving support for automatically maintaining the vehicle speed V at the set speed Vs. However, the CC support operation maintains the vehicle speed V at the set speed Vs that is set by the driver even when the preceding vehicle exists ahead of the vehicle 1.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2016-243315, filed on Dec. 15, 2016, the entire contents of which are incorporated herein by reference.

In addition, the entire contents of the above described Patent Literature 1 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A driving support apparatus, which involve such changes, are also intended to be within the technical scope of the present invention.

REFERENCE SIGNS LIST 1 hybrid vehicle
11 circumstance information obtaining unit
12 ECU
121 ACC supporting unit
122 deceleration supporting unit
123 intervening unit
131 power source
132 brake actuator
133 steering actuator
134 shift actuator
142 brake apparatus
143 turned wheel
144 gear mechanism
V vehicle speed
Vs set speed
Vd set speed

The invention claimed is:

1. A driving support apparatus comprising a controller,
the controller being programmed to perform a first support if a first execution condition is satisfied, wherein the first support accelerates a vehicle, decelerates the vehicle or makes the vehicle cruise so that a vehicle speed is maintained at a first speed,
the controller being programmed to perform a second support if a second execution condition is satisfied, wherein the second execution condition is a condition that a distance between the vehicle and a low speed driving point is equal to or less than a predetermined threshold value, the low speed driving point is a point at which the vehicle preferably stops, decelerates or moves slow, and the second support automatically decelerates the vehicle so that the vehicle speed decreases to be equal to or lower than a second speed lower than the first speed before the vehicle reaches the low speed driving point,
the controller being programmed (i) to perform the second support after forbidding acceleration of the vehicle by the first support, and then (ii) to keep forbidding the acceleration of the vehicle by the first support after the second support is completed and before a predetermined acceleration allowing condition is satisfied, and (iii) to allow the acceleration of the vehicle by the first support after the acceleration allowing condition is satisfied, if both of the first execution condition and the second execution condition are satisfied.

2. The driving support apparatus according to claim 1, wherein
the acceleration allowing condition includes a first allowing condition that a driver of the vehicle performs an operation for accelerating the vehicle.

3. The driving support apparatus according to claim 1, wherein
the second support is a driving support for decelerating the vehicle without stopping the vehicle so that the vehicle speed decreases to be equal to or lower than the second speed,
the acceleration allowing condition includes a second allowing condition that the vehicle passes a specific point, wherein the specific point is a point which the vehicle should pass without accelerating after the vehicle reaches the low speed driving point.

4. The driving support apparatus according to claim 1, wherein
the acceleration allowing condition includes a third allowing condition that a predetermined time elapses after the vehicle reaches the low speed driving point.

5. The driving support apparatus according to claim 1, wherein
the second support is a driving support for decelerating the vehicle without stopping the vehicle so that the vehicle speed decreases to be equal to or lower than the second speed,
the acceleration allowing condition includes a fourth allowing condition that the vehicle travels by a predetermined distance after the vehicle reaches the low speed driving point.

* * * * *